(12) United States Patent
Udo et al.

(10) Patent No.: US 6,190,072 B1
(45) Date of Patent: Feb. 20, 2001

(54) ARMREST WITH ARCUATE EDGE FOR KEYBOARD

(76) Inventors: Hiroshi Udo; Akiko Udo, both of 3-7-5 Ushita-shinmachi Higashi-ku, Hiroshima 732; Akihiro Udo, Sampole Hiroko 801 8 F, 17-5 Osuga-chou, Minami-ku 732, all of (JP)

( * ) Notice: Under 35 U.S.C. 154(b), the term of this patent shall be extended for 0 days.

(21) Appl. No.: 09/317,481

(22) Filed: May 24, 1999

(30) Foreign Application Priority Data

May 26, 1998 (JP) .................................. 10-162948
May 18, 1999 (JP) .................................. 11-136682

(51) Int. Cl.$^7$ .................................................. A47B 21/03
(52) U.S. Cl. ........................ 400/715; 248/118; 248/118.1
(58) Field of Search .................... 400/715, 488, 400/496, 489; 248/118, 118.1

(56) References Cited

U.S. PATENT DOCUMENTS

| | | | |
|---|---|---|---|
| 4,621,781 | * 11/1986 | Springer | 248/118 |
| 5,147,090 | * 9/1992 | Mandell et al. | 248/118.1 |
| 5,383,632 | * 1/1995 | Shirlin et al. | 248/118.5 |
| 5,456,542 | * 10/1995 | Welch et al. | 400/492 |
| 5,492,291 | * 2/1996 | Otani | 248/118.1 |
| 5,509,628 | * 4/1996 | Noble | 248/118 |
| 5,660,360 | * 8/1997 | Yang | 248/118 |
| 5,803,416 | * 9/1998 | Hanson et al. | 248/118 |
| 5,892,499 | * 4/1999 | Vulk, Jr. | 345/156 |

FOREIGN PATENT DOCUMENTS

| | | |
|---|---|---|
| 2268396 | * 1/1994 | (GB) . |
| 2505528 | 7/1996 | (JP) . |
| 2687814 | 11/1997 | (JP) . |
| 3043575 | 12/1997 | (JP) . |
| WO9325116 | 12/1993 | (WO) . |
| WO9707710 | 3/1997 | (WO) . |

* cited by examiner

*Primary Examiner*—Daniel J. Colilla
(74) *Attorney, Agent, or Firm*—Hovey, Williams, Timmons & Collins

(57) ABSTRACT

An armrest (1) for providing wrist and forearm support during keyboard and mouse operations is provided. The armrest (1) is placed at the front edge of the keyboard and supports most of the forearm from the elbow to the wrist so that the operator can operate the keyboard and handle the mouse, with the forearm supported close to the keyboard. The armrest (1) includes an enlarged support area (12, 22), an elbow protrusion area (13) at the longitudinal ends of the armrest (1), and two mouse pads (2: 21, 22) on the same surface running from the center area (11, 21) to one of the longitudinal ends. The armrest is positioned so that the center area (11, 21) of the mouse pad (2) faces the space bar (4), and the enlarged support area (12, 22) faces the number keypad (5) and projects out to the right of the number keypad. The armrest inclines downward longitudinally from the center area in front of the space bar (4) on the keyboard (3) towards the sides and transversely towards the front edge, which faces the operator.

10 Claims, 5 Drawing Sheets

MOUSE OPERATION
(AT THE RIGHT AREA OF
THE ENLARGED SUPPORT)

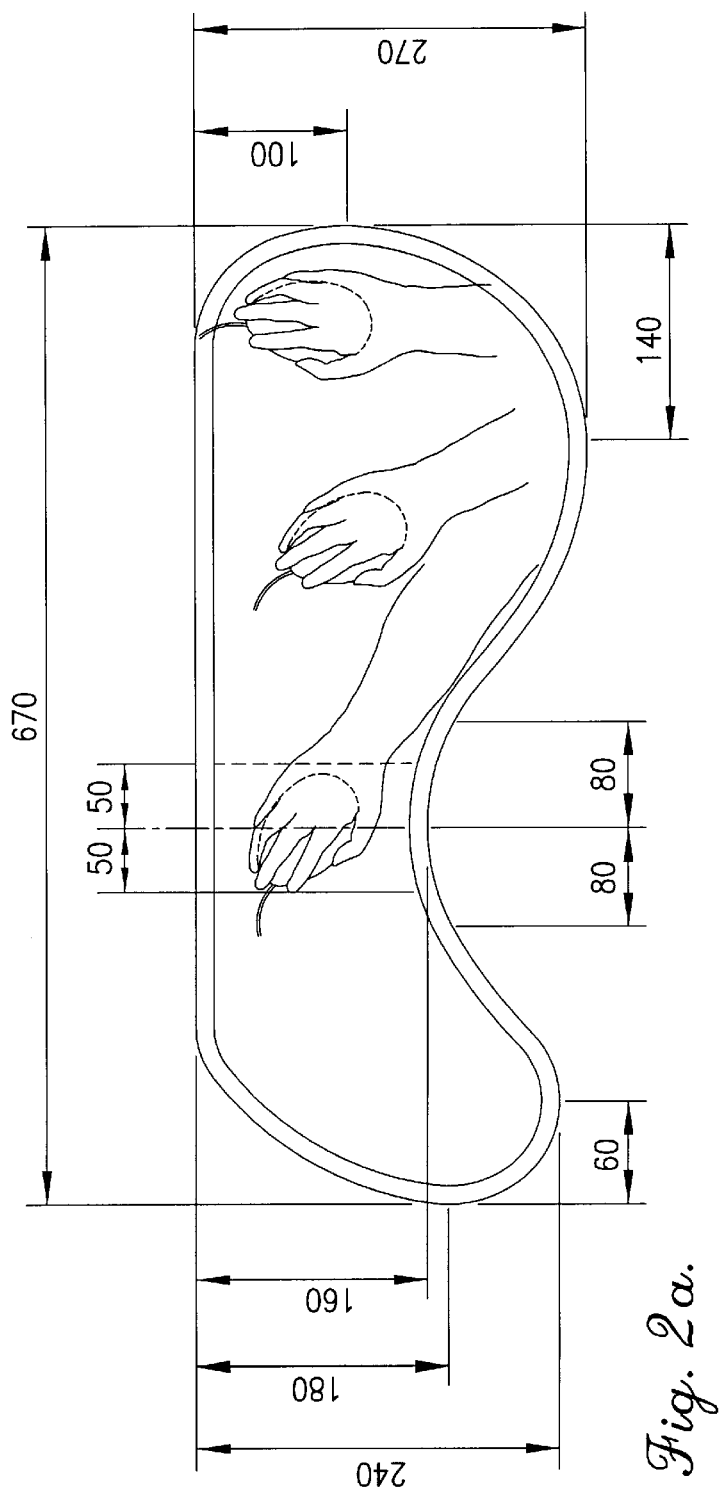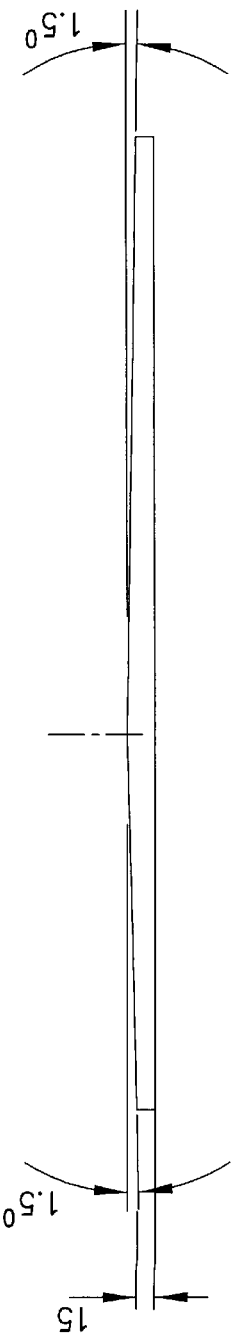
Fig. 2a.
Fig. 2b.

KEYBOARD OPERATION

MOUSE OPERATION (AT THE ENLARGED SUPPORT)

MOUSE OPERATION
(AT THE CENTER AREA)

MOUSE OPERATION
(AT THE LEFT AREA OF
THE ENLARGED SUPPORT)

MOUSE OPERATION
(AT THE RIGHT AREA OF
THE ENLARGED SUPPORT)

ARMREST WITH ARCUATE EDGE FOR KEYBOARD

RELATED APPLICATIONS

The entire disclosures of Japanese Patent Application No. H10-162948 filed on May 26, 1998, and Japanese Patent Application No. H11-136682 filed on May 18, 1999, including the specifications, claims, drawings, and summarys, are incorporated herein by reference in their entirety.

BACKGROUND OF THE INVENTION

1. Field of the Invention

The present invention relates to an armrest, which is placed at the front edge of the keyboard to help in using the keyboard and mouse by supporting the forearms (i.e., the arm area from approximately the elbow to approximately the wrist, not simply the wrist or palm). More specifically, the armrest supports most of the forearm, ranging from the elbow to the wrist, and allows the operator to handle the mouse with the forearm supported close to the keyboard.

2. Description of the Prior Art

The operation of keyboards is involved in a large portion of manual visual display terminal (VDT) operations such as data input, for example. These operations are responsible for a high incidence of health hazards such as neck, shoulder, and arm syndrome because of the motions involved in continually maintaining the forearms in a lifted position without any support and repetitively using the arms and fingers. The inventors of the instant application have also proposed an armrest for VDT operations (Japanese Registered Utility Model Gazette No. 2505528).

Recent dramatic innovations in operating systems have brought the graphical user interface (GUI) approach into the mainstream of man-machine interface technology and enabled mouse operation to be integrated with traditional keyboard operation in almost every computing setting.

It is known that the health hazards associated with VDT operation result from muscular or nervous fatigue induced by a specific working posture in which the neck is inclined forward and the arms are held, without any support, away from the trunk. Another factor contributing to this fatigue is the workload on the fingers in running the keyboard. Now that mouse operations have been added to traditional VDT operations, it is necessary to examine possible solutions for improving operability and mitigating fatigue.

So far, several resting devices for wrists and for palms (hereafter collectively referred to as "palmrests") have been suggested for reducing fatigue. These proposed devices have not adequately taken into account possible improvements in operability (and reduction of fatigue) focused on mouse operation.

The majority of the existing palmrests are configured with the mouse pad separate which is physically separate from the keyboard pad (a "separate-type" palmrest) while a few of the existing palmrests have been designed to combine the mouse pad with the keyboard pad (an "integrated-type" palmrest). As one example, Japanese Registered Utility Model Gazette No. 3043575 discloses a integrated-type palmrest which is placed on the top of a desk together with a board for the keyboard. The palmrest is configured with a mouse pad that can be drawn out from the board, to the right of the keyboard and at a lower level than the top surface of the palmrest.

The second prior art integrated-type palmrest is placed on the top of a desk together with a board for the keyboard. This palmrest is configured with the mouse pad attached to the board on the right of the keyboard and at a lower level than the top surface of the palmrest. The third integrated-type palmrest disclosed in Japanese Patent Gazette No. 2687814 is integrated with a keyboard arrangement board and a mouse operating board which is placed midway between the keyboard and the computer monitor or cathode-ray tube (CRT) at almost as high a level as the top surface of the palmrest.

In the case of a mouse pad placed to the right of the keyboard, it can be reasonably suggested that a significant distance (approx. 41 cm) between the thumb (on the space bar) and the mouse pad would degrade the operability when both are used concurrently. This is because the right hand is repeatedly moved over this distance, and there is a heavy load on the shoulder girdle muscle during internal rotation and external rotation of the right humeral articulation, and on the trapezius (shoulder) during the abduction of right humeral articulation. Internal rotation affects the infraspinatus and teres minor muscle, while external rotation affects the infrascapular muscle, teres major muscle, pectoralis major muscle and the latissimus dorsi muscle.

In another prior art model the mouse pad is placed behind the keyboard. This arrangement makes it necessary to handle the mouse with the elbow sustained away from the trunk. As a result, the trapezius and brachial muscles (deltoid muscle) suffer a significant muscular load during the operation. The substantial distance (approx. 28 cm) between the space bar and mouse pad imposes a great muscular load to the brachial muscle which is lifted up and down across the keyboard. There are also other potential problems during mouse operations including inadvertent keystrokes when reaching for the mouse.

It should be noted that the effectiveness of armrests in mouse and keyboard operations is undisputed as it has been reported that armrests reduce the electromyograms of the brachioradial muscle, the bicep brachii, the deltoid muscle, the infrascarpular muscle and the trapezius, as compared with those when it was not used. When a working environment involving keyboard and mouse operations and the resultant working posture is closely analyzed from the viewpoint of health hazard prevention, an armrest should feature the following configurations.

First, the armrest should be adequately wide to extensively support the overall forearms, ranging from the wrist through the elbow. The forearm support of the armrest should also protrude (widen) towards the operator around its ends in order to provide support for the forearms positioned at the sides of the operator. The height of the armrest should also be adjustable and should incline downward away from its center, interfacing the space bar toward the lateral ends and the operator. This design is necessary in order to minimize lifting of the shoulders and to obtain better contact between the forearm and the surface of the armrest. Furthermore, the armrest should provide an area for using the mouse which extends from about 5 cm to the left of the center to about 10 cm to the right of the number keypad. An enlarged support area should be supplied on the right side of the armrest to support the right forearm during mouse operations. Finally, the armrest should be securable to the front edge of the desk and capable of pivoting towards the keyboard using hinges attached at its longitudinal ends or distal bottom in order to be usable for some shallow desks.

SUMMARY OF THE INVENTION

The invention addresses these requirements and overcomes the problems with the prior art devices. When placed at the front edge of the keyboard, the armrest of the invention assists the operator in using the keyboard and the mouse by supporting the operator's forearms. The inventive armrest is a self-contained unit which can be successfully integrated with various keyboards for specific purposes. The armrest supports most of the forearms (ranging from approximately the elbow to the approximately the wrist) and allows the operator to handle the mouse with the forearm supported close to the keyboard. Furthermore, the armrest helps prevent neck, shoulder, and arm syndrome by reducing the muscular load on the neck, shoulders and arms. The armrest provides an enlarged support and/or elbow protrusion area at the longitudinal ends, and a mouse pad on the same surface from its center to the end having the relevant enlarged support.

The mode for carrying out the invention is described below. The armrest has a width adequate to transversely support the forearms and a thickness equal to the distance between the top surface of the desk and the top of the space bar when it is pushed down (or an alternative means to adjust the armrest to the top of the relevant key when it is pushed down). The armrest also inclines downwardly from the center at the space bar toward the longitudinal ends and towards the operator. The armrest is preferably designed to be embedded into an independently manufactured frame, which can be pivoted towards the keyboard via hinges attached at both longitudinal ends or at the bottom on the keyboard side.

BRIEF DESCRIPTION OF THE DRAWINGS

FIG. 2(a) is a plan view of an inventive armrest illustrating the various positions of the user's hand and the mouse during operations utilizing a mouse;

FIG. 2(b) is a front view of the armrest of FIG. 2(a);

DETAILED DESCRIPTION OF THE INVENTION

Figure 1A:
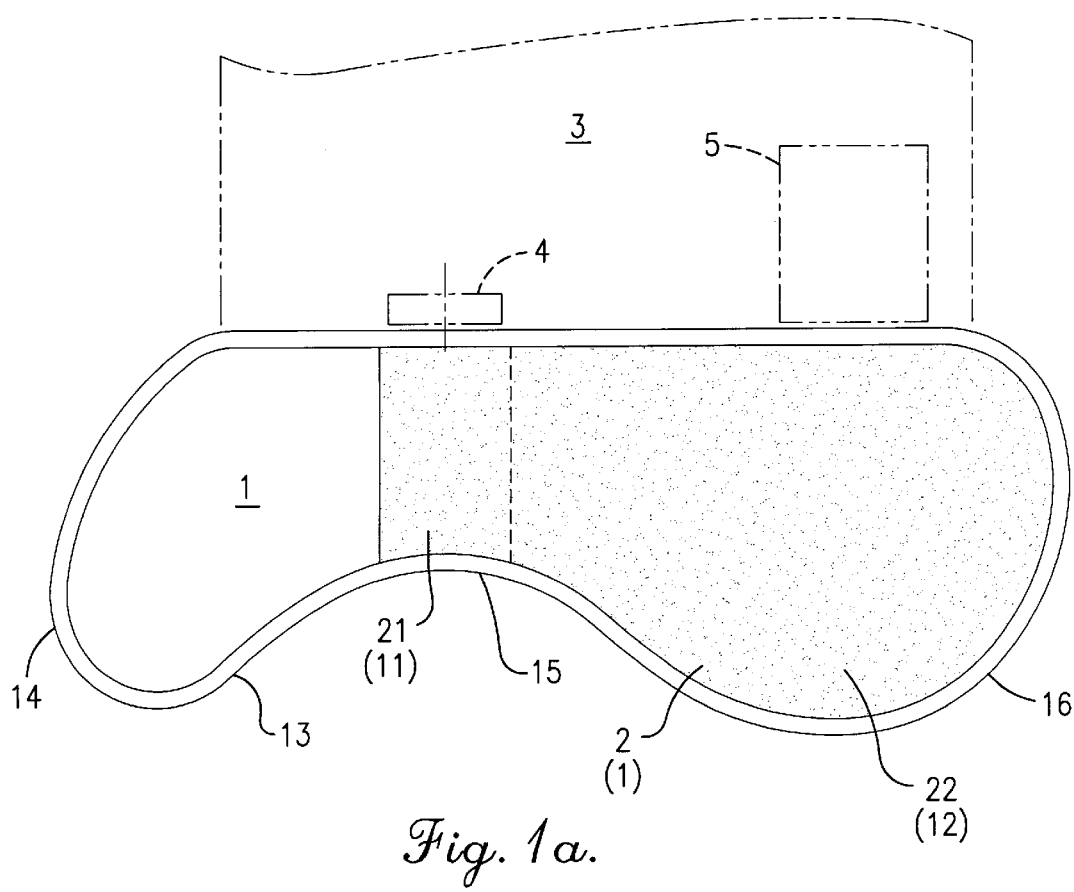
FIG. 1(a) is a plan view of an armrest in accordance with the invention.
Figure 1B:
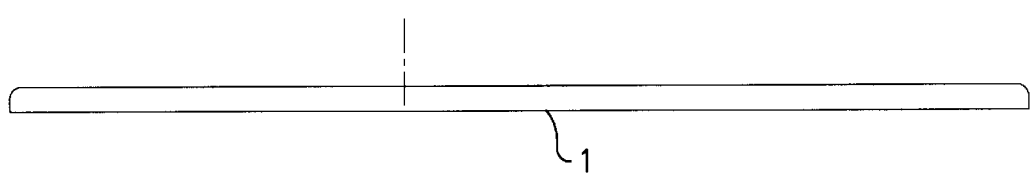
FIG. 1(b) is a front view of the armrest of FIG. 1(a)
Figure 3A:
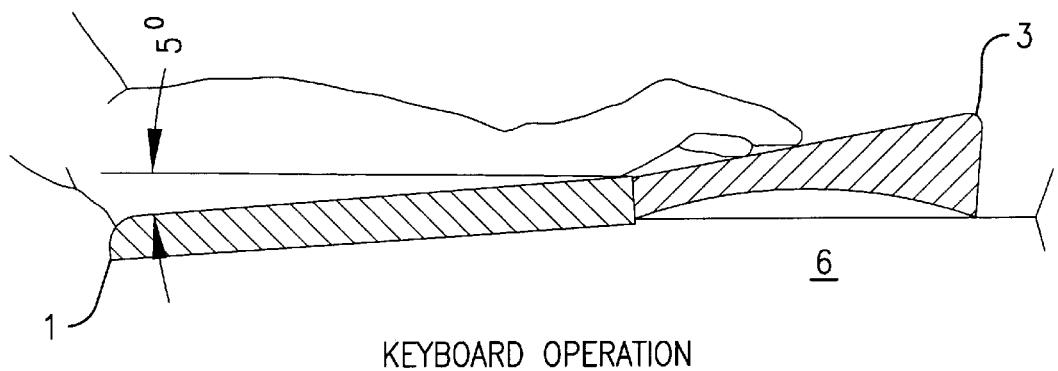
FIG. 3(a) is a cross-sectional end view of an armrest according to the invention during keyboard operations.
Figure 3B:
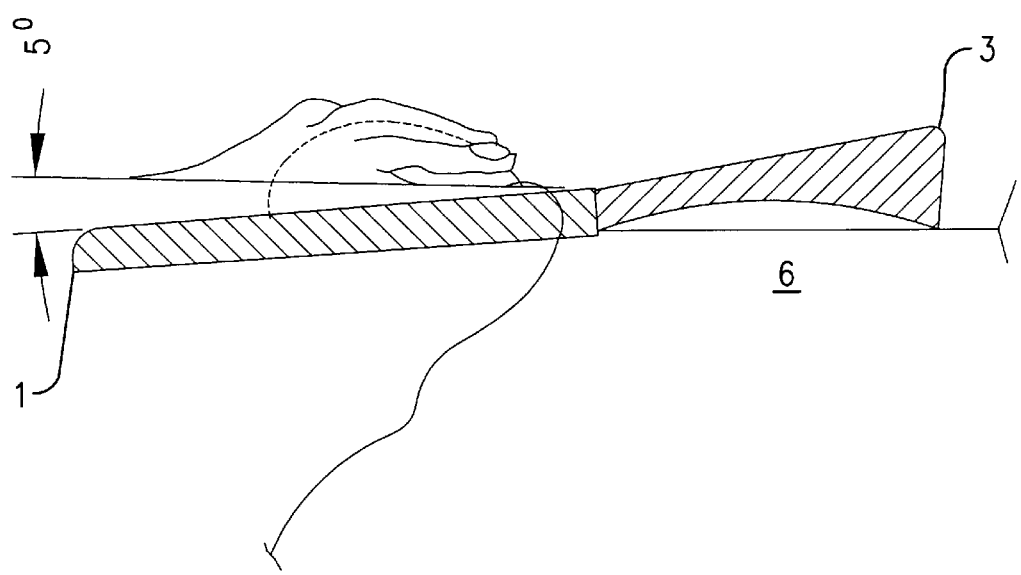
FIG. 3(b) is a cross-sectional end view of the armrest of FIG. 3(a) during mouse operations.
Figure 4A:
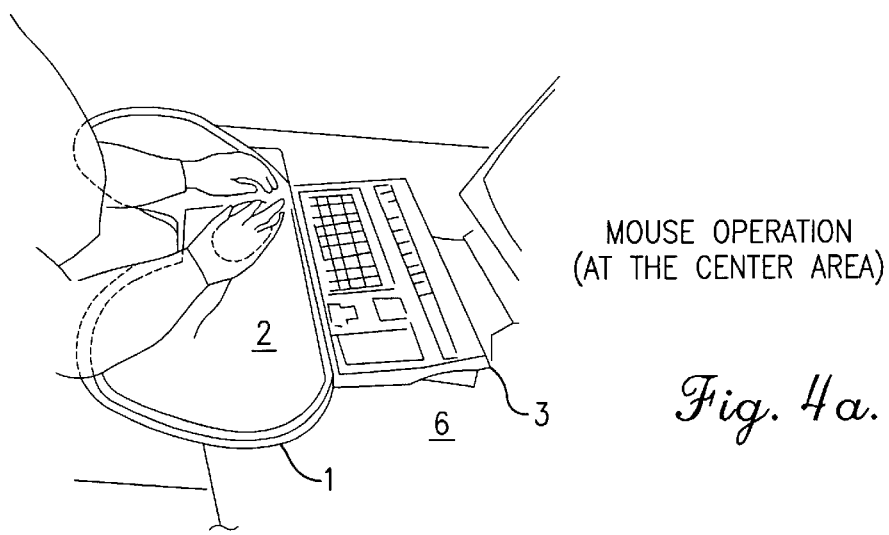
FIG. 4(a) is a perspective view of an inventive armrest during mouse operations wherein the mouse is positioned near the center portion of the armrest.
Figure 4B:
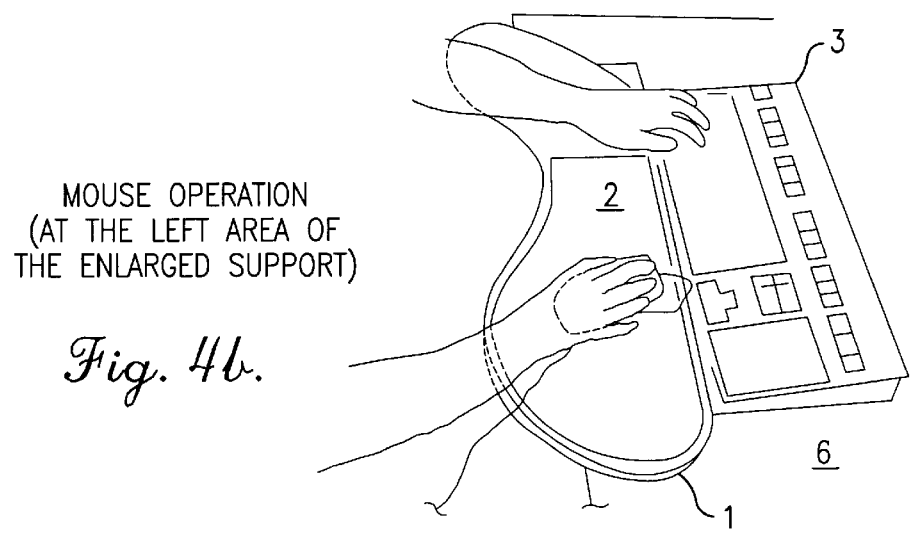
FIG. 4(b) is a perspective view similar to FIG. 4(a) wherein the mouse is positioned at the left portion of the enlarged support.
Figure 4C:
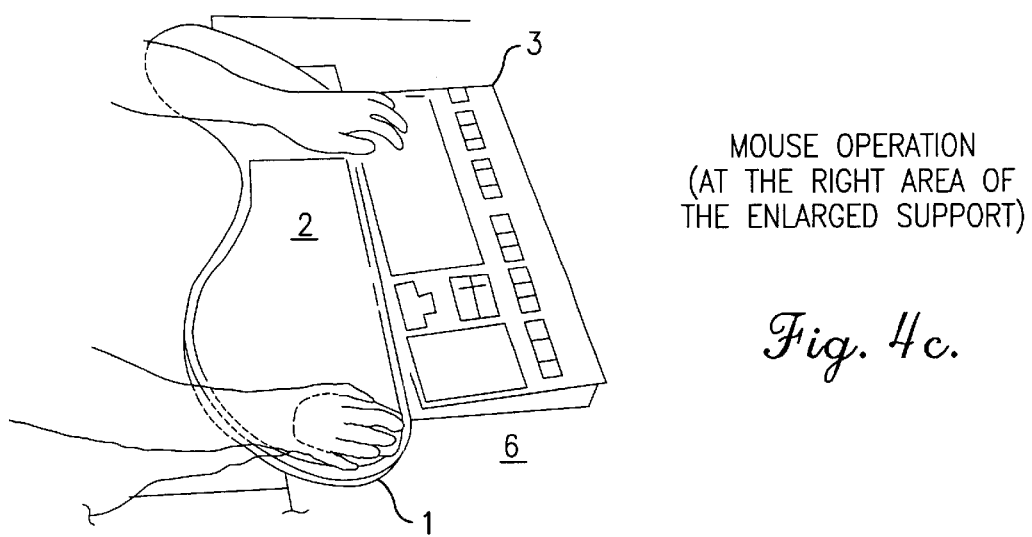
FIG. 4(c) is a perspective view similar to FIGS. 4(a)–4(b) wherein the mouse is positioned at the right area of the enlarged support.

The drawings illustrate a preferred embodiment of the inventive armrest. In FIG. 1(a), numeral 1 indicates the armrest which includes a center 11, an enlarged support 12, an elbow protrusion 13 defined by a first arcuate edge 14, a mouse operating area (mouse pad; 2), a center 21 in part defined by second arcuate edge 15, an enlarged support 22 defined by a third arcuate edge 16, a keyboard 3, a space bar 4, a number keypad 5 and an operational desk 6 (the numbering is consistent in FIGS. 2–4).

As illustrated in the figures, the armrest supports most of the forearms from the elbow to the wrist, and provides an enlarged support 12, 22 at one longitudinal end to allow the operator to use the mouse close to the keyboard 3. In addition, the armrest 1 provides a mouse operating area (hereinafter used interchangeably with 'mouse pad') on the same surface ranging from the center 11, 21 to the end including the relevant enlarged supports 12, 22.

The armrest 1 should have a sufficient width to adequately, transversely support the forearms, a thickness equal to the top level of the space bar 4 when it is pushed down in the keyboard 3 or alternative means (not shown) to adjust the armrest level to that of the relevant key top when it is pushed down. The armrest 1 should also have a downward inclination from the center 11, 21 facing the space bar 4 on the keyboard 3 toward the longitudinal ends and operator (See FIGS. 2(b) and 3). The armrest 1 may be designed to be embedded into an independently manufactured frame, which can be pivoted towards the keyboard with the hinges 7 (See FIG. 5) attached at both longitudinal ends or at the bottom, on the keyboard side (described in more detail below).

Hereafter, the components are extensively described using a keyboard for a desktop personal computer as an example. The numerical values (dimensions) are supplied to assist in the understanding of the invention.

The armrest 1 shown in FIG. 2 is 67 cm long longitudinally, 16 cm wide at the minimal area, and 27 cm wide at its widest point in the transverse direction. The left elbow protrusion 13 is 24 cm long. It will be appreciated that the armrest can be configured to be reversible so that the elbow protrusion 13 can be on the right for left-handed operators, with the enlarged support 12, 22 on the left. In addition, the enlarged support 12, 22 may be symmetrically formed to accommodate both right-handed and left-handed operators in one device. The following description is based on an armrest 1 for right-handed operators.

Figure 5A:
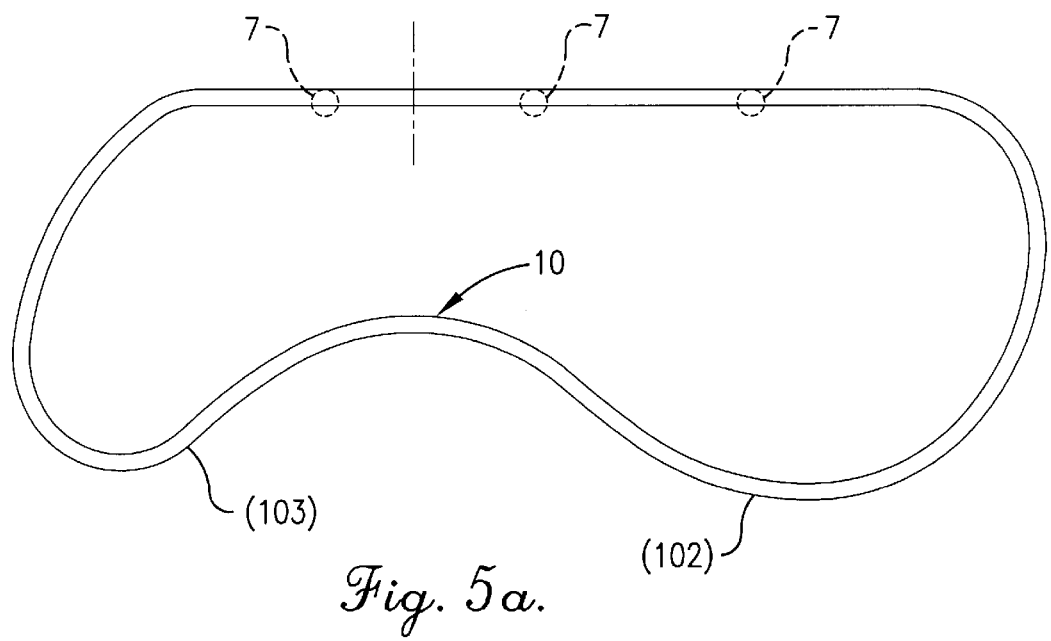
FIG. 5(a) is a plan view of an inventive armrest.
Figure 5B:
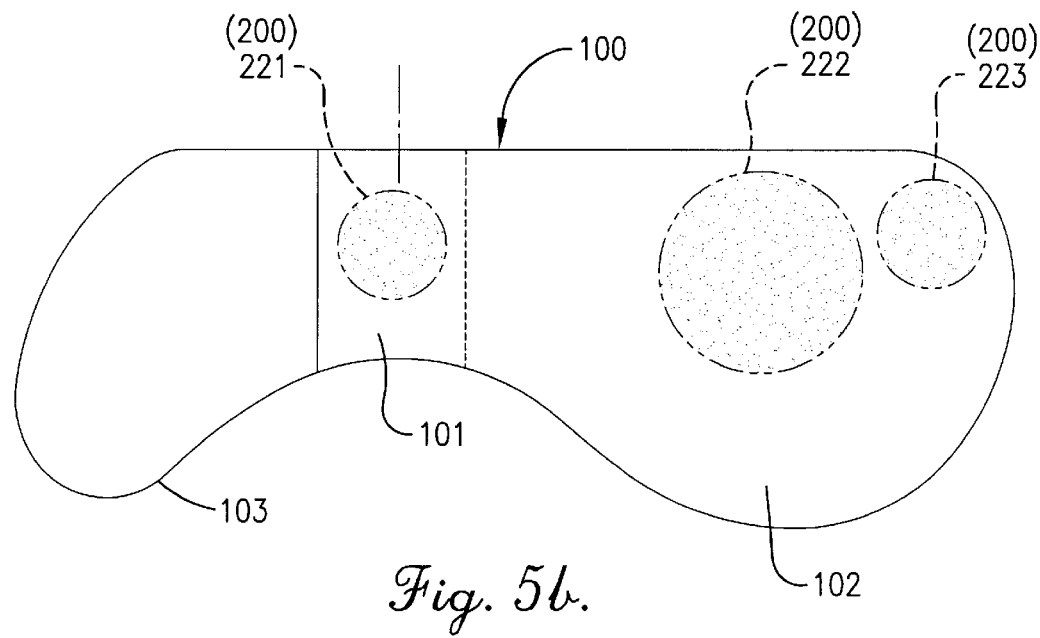
FIG. 5(b) is a plan view of an inventive armrest illustrating the mouse locations on the armrest.

The mouse operating area 2 may be composed of a single mouse pad applied over the area or of three separate mouse pads positioned at the center 21 and the left and right areas of the enlarged support 22 (See FIG. 5). It is important to organize the mouse operating areas 2 at the center 11, 21 and at the enlarged support 12, 22 on the armrest 1 in order to minimize the distance between the space bar 4 and mouse (pad). Such mouse operating area organization will eliminate the level gap between the armrest and mouse pad and allow the operator to freely utilize the three mouse operating areas, depending on the intensity of the mouse operation and the number keypad operation. The mouse pad areas can be freely designed in terms of shape, figure, and color.

The mouse operating area 2 is aligned so that its center 21 faces the space bar and wraps around the transverse midpoint of the armrest 1. On the other hand, in the case of the enlarged support 22, the mouse operating area 2 is situated facing the number keypad 5, with the right edge projecting out about 10 cm from the right side of the number keypad.

The mouse requires an approximately 3 cm run in the lateral direction and a 2 cm run in the vertical direction to move the pointer across the full range of the display laterally and vertically, respectively. A mouse operating area with a diameter of 10 cm will make the differences in the space bar positioning almost negligible among different keyboards. Preferably, a single mouse pad 2 covers the enlarged support 22, thus forming an undivided operating area for uninterrupted pointer movement.

As for the existing armrest proposed in Japanese Patent Application No. 2505528, the operator has to sustain the portion of his or her forearms which is approximately 10 cm from the hand joint cross striation to the elbow when the operator's fingers are assigned to the home positions. The instant invention provides an enlarged support 12 to further reduce the muscular load required to sustain the forearms.

The enlarged support 12 starts at a 31 cm distance from the left edge of the armrest 1, at the point facing the number keypad 5. The support's front edge gradually advances toward the operator to attain a maximum 11 cm gain from the baseline (the total width is 27 cm) at a 53 cm distance from the left edge of the armrest. The front edge gradually curves toward the keyboard and converges with the back edge on the right side.

The enlarged support 12 accommodates the forearm within the armrest 1 and supports the forearm over a length of 19–25 cm, from the hand joint cross striation towards the elbow when the mouse is displaced approximately 4.5 cm away from the center of the space bar 4 toward the left. A cross sectional view of the armrest 1 related to keyboard and mouse operation is provided in FIGS. 3(*a*)–3(*b*), with another view related to mouse operation shown in FIGS. 4(*a*)–4(*c*).

The above-mentioned armrest 1 has the following benefits.

(1) The armrest 1 successfully eliminates compression of the wrist nerves (ulnar nerve) and subsequent pain and numbness, which are often observed when a palmrest with some 6 cm width is used to support the wrists alone. The armrest 1 provides a central area 11, 21 as wide as 16 cm, an elbow protrusion 13 with an extra 8 cm towards the operator at the left side, and an enlarged support 12, 22 with an extra 11 cm towards the operator at the right side. The armrest 1 eliminates nerve compression and subsequent pain and numbness by extensively supporting the wrists, forearms and elbows.

(2) The armrest 1 helps support the arm, whose weight is equivalent to 5% of the total body weight, by means of the forearm, to reduce the load on the shoulder muscle (trapezius), brachial muscle (deltoid muscle) and antebrachial muscle (brachioradial muscle) and to mitigate or prevent pain in the shoulder girdles and the arms.

(3) The armrest 1 eliminates compression of the wrist nerves (median nerve) and prevents carpal tunnel syndrome (characterized by numbness of the affected nerve), which is often observed when the wrists are supported by the desk without any armrest and dorsally flexed because of the gap between the keyboard and the desk. The armrest level can be adjusted to that of the keyboard to keep the fingers, wrists and forearms straight and to prevent carpal tunnel syndrome.

(4) The armrest 1 mitigates the muscle load on the shoulders, upper arms, forearms and wrists because it provides a mouse pad on an even plane and allows the operator to use the mouse by supporting his or her wrists and forearms.

(5) The mouse pad in the center area 11, 21 can be used when mouse operation is less intensive than keyboard operations, such as during data input processes. The central positioning of the mouse reduces the distance between the right thumb (on the space bar) and the mouse to roughly 13 cm, as compared to the 41 cm distance typical of conventional, external or independent mouse pads. It therefore reduces the movement range of the right humeral articulation during internal rotation and external rotation. As a result, the load is alleviated at the shoulder girdle muscle and the operability is improved because it takes less time to move the forearm between the keyboard and the mouse.

(6) The enlarged support 12, 22 projects out 11 cm toward the operator to support the right forearm so that the forearm does not overrun the armrest, as it does in the case of palmrests, when it is displaced toward the operator to operate the mouse in the center area 11, 21. The enlarged support 12, 22 supports the right forearm over a 19 cm to 25 cm length.

(7) Referring to FIG. 5, the left area 222 of the mouse pad in an enlarged support 102 is used for operations in which the mouse is used more intensively than the keyboard, such as developing graphics. The left area 222 of the pad is situated somewhat to the left of the number key pad, thus reducing the distance (displacement distance) to the right thumb (on the space bar) to roughly 16 cm, as compared to the 41 cm distance typical of conventional, external or independent mouse pads. The reduced distance helps limit the range of internal rotation and external rotation of the right humeral articulation to alleviate the muscular load of the shoulder girdle muscle. Also it shortens the time required to move the right hand between the keyboard and mouse to improve operability. In addition, the enlarged support allows the operator to continue operations while 12 cm of his or her right forearm is supported by the projected area, resulting in eliminated wrist compression and a reduced load on the shoulder girdle muscles.

(8) When using the mouse in front of the number keypad 5 (the left area 222 of the mouse pad), the mouse may disturb operation of the number keypad 5. Therefore, the right area of the mouse pad projects out from the edge of the number keypad 5 in order to avoid this kind of disturbance. Using the right area 223 (See FIG. 5) of the pad to operate the number keypad 5 reduces the distance (displacement distance) to the right thumb home position (space bar) to roughly 36 cm, as compared to the 41 cm distance typical of conventional, external or independent mouse pads. In the same manner as with the left area 222 of the mouse pad, it eliminates wrist compression and reduces the load on the shoulder girdle muscles.

When operating the number keypad 5, the right area 223 of the mouse pad can also be used as a storage area for the mouse, in order to avoid the disturbance of these operations.

(9) The armrest 1, which accommodates the mouse pads within its longitudinal range, allows the operator to handle the mouse within his or her shoulder width, even on a narrow desk. The armrest 1 can be supplied with a mechanism to affix it to the desk at the top edge, facing the keyboard and to reverse it toward the keyboard (on hinges 7) at the top end, to secure operational space when using a shallower desk. Therefore the armrest 1 has a space saving advantage.

(10) Essentially, the armrest 1 successfully improves operability during keyboard and mouse operations, and subsequently has significant preventive effects against neck, shoulder, and arm disorders and carpal tunnel syndrome.

It should be noted that the working example is not exclusive in terms of the design of the invention. The armrest 1 can be modified to adapt to any commercially available keyboard and be within the scope of protection. For example, it can be duly configured to be adjustable in height and length, or it can include a concave palmrest area on the keyboard side, similar to those typically found in laptop computers. Furthermore, the armrest can be built into the desk or tabletop.

The armrest may be configured together with an independently manufactured frame 10 so that the operator can install his or her own armrest of the same model by replacing others. An example of this configuration is illustrated in FIG.

5(a) wherein the frame 10 is fixed at the front edge of the desk with the hinges 7 which are used to pivot the frame itself toward the keyboard 3, while the armrest body 100 can be placed into and removed from the fixed frame 10.

The armrest 100 and mouse pads 221, 222, 223 can also be replaced with removable covering components to ensure that the operators can use their armrests in a similar way (not shown).

We claim:

1. An apparatus comprising:
   a keyboard having a forward edge, a plurality of keys, and an operating area length defined by the distance between the leftmost and rightmost keys; and
   an armrest comprising:
      an elongated body having a length, a width, and a rectilinear edge positioned adjacent said keyboard forward edge, said armrest being operable for supporting a forearm of a person operating said keyboard and having a length at least about the length of said keyboard operating area; and
      a mouse operating area,
   said apparatus presenting a boundary defined by said keyboard forward edge, said boundary creating a proximate side and a remote side with said remote side being on the same side of the boundary as said plurality of keys and said proximate side being on the same side of the boundary as said armrest, wherein said mouse operating area is located on the proximate side of said boundary.

2. The apparatus of claim 1, said mouse operating area being integrally formed with said elongated body.

3. The apparatus of claim 1, said keyboard including a space bar which is depressed during use, said depressed space bar presenting an upper surface at a given height, said armrest having an upper surface and a thickness, the vertical height of said armrest being such that the armrest upper surface at an area adjacent said rectilinear edge is at a height approximately equal to said depressed space bar upper surface height.

4. The apparatus of claim 3, wherein the thickness of said armrest decreases as the distance from said armrest rectilinear edge increases.

5. The apparatus of claim 1, said keyboard including an elongated space bar having first and second ends and a center point located at a distance approximately halfway between said first and second ends, said armrest having a thickness adjacent said rectilinear edge and adjacent said center point, wherein the thickness of said armrest decreases as the distance from said center point increases.

6. An apparatus comprising:
   a keyboard comprising:
      a forward edge;
      a plurality of keys including a space bar which is depressed during use and which presents an upper surface at a given height when in a depressed position; and
      an operating area length defined by the distance between the leftmost and rightmost keys; and
   an armrest comprising:
      an elongated body having a length, a width, and a rectilinear edge positioned adjacent said keyboard forward edge, said armrest being operable for supporting a forearm of a person operating said keyboard and having a length at least about the length of said keyboard operating area; and
      a mouse operating area in contact with said armrest upper surface,
   said armrest presenting a substantially planar upper surface and having a vertical height such that the armrest upper surface at an area adjacent said rectilinear edge is at a height approximately equal to said depressed space bar upper surface height.

7. The apparatus of claim 6, wherein the thickness of said armrest decreases as the distance from said armrest rectilinear edge increases.

8. The apparatus of claim 6, said space bar being elongated and having first and second ends and a center point located at a distance approximately halfway between said first and second ends, said armrest having a thickness adjacent said rectilinear edge and adjacent said center point, wherein the thickness of said armrest decreases as the distance from said center point increases.

9. An apparatus comprising:
   a keyboard having forward and rearward edges presenting a distance therebetween, a plurality of keys, and an operating area length defined by the distance between the leftmost and rightmost keys, said keyboard including a spacebar which is depressed during use, said depressed spacebar presenting an upper surface at a given height; and
   an armrest comprising:
      an elongated body having a length, a protruded portion, and a rectilinear edge positioned adjacent said keyboard forward edge, said armrest being operable for supporting a forearm of a person operating said keyboard, presenting a substantially planar upper surface, and having a length at least about the length of said keyboard operating area; and
      a mouse operating area in contact with said upper surface,
   said protruded portion being at least partly defined by said rectilinear edge and an outer arcuate edge and presenting a maximum width between said rectilinear edge and said arcuate edge, said maximum width being greater than the distance presented by said forward and rearward keyboard edges, said armrest having a vertical height which is such that the armrest upper surface at an area adjacent said rectilinear edge is at a height approximately equal to said depressed upper surface height.

10. The apparatus of claim 9, wherein the thickness of said armrest decreases as the distance from said armrest rectilinear edge increases.

* * * * *